(12) United States Patent
Liu

(10) Patent No.: US 11,910,445 B2
(45) Date of Patent: Feb. 20, 2024

(54) RANDOM ACCESS METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 425 days.

(21) Appl. No.: 17/420,651

(22) PCT Filed: Jan. 10, 2019

(86) PCT No.: PCT/CN2019/071218
§ 371 (c)(1),
(2) Date: Jul. 2, 2021

(87) PCT Pub. No.: WO2020/142997
PCT Pub. Date: Jul. 16, 2020

(65) Prior Publication Data
US 2022/0104266 A1   Mar. 31, 2022

(51) Int. Cl.
*H04W 4/00*   (2018.01)
(52) U.S. Cl.
CPC .............. *H04W 74/0833* (2013.01)
(58) Field of Classification Search
CPC ............... H04W 78/04; H04W 78/0433
See application file for complete search history.

(56) References Cited

U.S. PATENT DOCUMENTS 9,788,304 B2 * 10/2017 Xia ..................... H04W 72/30
2017/0006638 A1 * 1/2017 Sahlin ................. H04W 74/004
(Continued)

FOREIGN PATENT DOCUMENTS

CN   108702763 A    10/2018
EP      3780745 A1 *  2/2021   .......... H04J 11/0069

OTHER PUBLICATIONS

International Searching Authority, English Translation of the Written Opinion of the International Searching Authority PCT/CN2019/071218, WIPO, pp. 1-3. (dated 2019).*
(Continued)

*Primary Examiner* — Chi H Pham
*Assistant Examiner* — Elisabeth Benoit Magloire
(74) *Attorney, Agent, or Firm* — Arch & Lake LLP

(57) ABSTRACT

A method and device of random access are provided. The method may be applied to a base station. The base station may transmit a broadcast message to a user equipment (UE). The broadcast message may include physical random access channel (PRACH) configuration information and supplementary resource indication information. The PRACH configuration information may include first indication information for characterizing first physical resource and second indication information for characterizing a random access preamble sequence. The base station may obtain a location of a first reference synchronization broadcast block (SSB) synchronization signal according to the first physical resource corresponding to the PRACH configuration information. The base station may monitor, when the sending of the first reference SSB synchronization signal fails, the random access preamble sequence on the second physical resource corresponding to the supplementary resource indication information.

20 Claims, 13 Drawing Sheets

---

Transmitting a broadcast message to a UE, wherein the broadcast message includes PRACH configuration information and supplementary resource indication information; the PRACH configuration information includes: first indication information for characterizing first physical resource and second indication information for characterizing random access preamble sequence; and the supplementary resource indication information is used for characterizing second physical resource   — 101

Obtaining a location of a first reference SSB synchronization signal according to the first physical resource corresponding to the PRACH configuration information, wherein the first reference SSB synchronization signal is at a synchronization signal transmission period most proximate to the first physical resource and before the first physical resource   — 102

Monitoring the random access preamble sequence on the second physical resource corresponding to the supplementary resource indication information when the first reference SSB synchronization signal is unsuccessfully transmitted   — 103

(56) References Cited

U.S. PATENT DOCUMENTS

| | | | | |
|---|---|---|---|---|
| 2017/0303204 | A1* | 10/2017 | Hu | H04W 52/325 |
| 2018/0279387 | A1* | 9/2018 | Hui | H04W 74/0833 |
| 2018/0331728 | A1* | 11/2018 | Tsai | H04W 74/0833 |
| 2019/0020517 | A1* | 1/2019 | Abedini | H04J 11/0076 |
| 2019/0021062 | A1* | 1/2019 | Abedini | H04L 27/2613 |
| 2019/0215216 | A1* | 7/2019 | Abdoli | H04L 27/266 |
| 2019/0320430 | A1* | 10/2019 | Kim | H04L 5/0094 |
| 2019/0342925 | A1* | 11/2019 | Zhang | H04W 52/36 |
| 2020/0274606 | A1* | 8/2020 | Kang | H04B 7/0626 |
| 2021/0144768 | A1* | 5/2021 | Isokangas | H04W 36/0077 |

OTHER PUBLICATIONS

International Search Report issued in PCT/CN2019/071218 dated Sep. 27, 2019 with English translation, (4p).
Xiaomi, "Initial Access in NR Unlicensed", 3GPP TSG RAN WG1 Meeting #94, R1-1809219, Aug. 24, 2018, (5p).
Xiaomi Communications, "SS/PBCH blocks transmission for NR unlicensed", 3GPP TSG RAN WG1 Meeting #93, R1-1807208, May 25, 2018, (2p).

* cited by examiner

RANDOM ACCESS METHOD AND DEVICE

CROSS-REFERENCE TO RELATED APPLICATION

The present application is the national stage application of PCT Application No. PCT/CN2019/071218, filed on Jan. 10, 2019, the entire contents of both of which are hereby incorporated by reference for all purposes.

TECHNICAL FIELD

The present disclosure relates to communication technology, and more particularly, to a method and device of random access.

BACKGROUND

3GPP has conducted a research on unauthorized spectrum (NRU) of New Radio (NR) of the fifth generation communication technology (5G) to provide a solution for supporting separate networking of unauthorized cells. Considering the continuity of the NRU design and the 5G design, NRU has inherited 5G NR technology. The design of the unauthorized spectrum shall comply with the relevant laws and regulations of various countries and regions around the world, such as technologies of Listen before Talk (LBT), Occupied Channel Bandwidth (OCB), Channel Occupancy Time (COT), etc. LBT mechanism is a mechanism that coexists with Wireless Fidelity (WiFi), which means that whether the channel is idle or not needs to be listened to before the channel is used for transmitting information, and if the channel is occupied, it cannot be used to transmit the information at a given time.

In the related technology, random access is an important new feature of separate networking scheme for the unauthorized cells. In the first step of the random access process, the user equipment (UE) sends an uplink preamble sequence according to Physical Random Access Channel (PRACH) resource configured by cell broadcast.

SUMMARY

Embodiments of the present disclosure provide a method and device of random access.

According to a first aspect of the present disclosure, there is provided a method of random access. The method may be applied to a base station. The base station may transmit a broadcast message to a user equipment (UE). The broadcast message may include physical random access channel (PRACH) configuration information and supplementary resource indication information. The PRACH configuration information may include first indication information for characterizing first physical resource and second indication information for characterizing a random access preamble sequence. The supplementary resource indication information may be used for characterizing second physical resource. The base station may obtain a location of a first reference synchronization broadcast block (SSB) synchronization signal according to the first physical resource corresponding to the PRACH configuration information. The first reference SSB synchronization signal may be at a synchronization signal transmission period most proximate to the first physical resource and before the first physical resource. The base station may monitor the random access preamble sequence on the second physical resource corresponding to the supplementary resource indication information when the first reference SSB synchronization signal is unsuccessfully transmitted.

According to a second aspect of the present disclosure, there is provided a method of random access. The method may be applied to a user equipment (UE). The UE may receive a broadcast message transmitted from a base station. The broadcast message may include PRACH configuration information and supplementary resource indication information. The PRACH configuration information may include first indication information for characterizing first physical resource and second indication information for characterizing a random access preamble sequence. The supplementary resource indication information may be used for characterizing second physical resource. The UE may obtain a location of a first reference SSB synchronization signal according to the first physical resource corresponding to the PRACH configuration information. The first reference SSB synchronization signal may be at a synchronization signal transmission period most proximate to the first physical resource and before the first physical resource. The UE may transmit the random access preamble sequence to the base station by using the second physical resource corresponding to the supplementary resource indication information when no first reference SSB synchronization signal is detected on physical resource occupied by the first reference SSB synchronization signal.

According to a third aspect of the present disclosure, there is provided a device. The device may include one or more processors, a non-transitory computer-readable memory storing instructions executable by the one or more processors. The one or more processors may be configured to transmit a broadcast message to a UE. The broadcast message may include PRACH configuration information and supplementary resource indication information. The PRACH configuration information may include first indication information for characterizing first physical resource and second indication information for characterizing random access preamble sequence. The supplementary resource indication information may be used for characterizing second physical resource. The one or more processors may further be configured to obtain a location of a first reference SSB synchronization signal according to the first physical resource corresponding to the PRACH configuration information. The first reference SSB synchronization signal may be at a synchronization signal transmission period most proximate to the first physical resource and before the first physical resource. The one or more processors may further be configured to monitor the random access preamble sequence on the second physical resource corresponding to the supplementary resource indication information when the first reference SSB synchronization signal is unsuccessfully transmitted.

According to a fourth aspect of the present disclosure, there is provided a device. The device may include one or more processors, a non-transitory computer-readable memory storing instructions executable by the one or more processors. The one or more processors may be configured to receive a broadcast message transmitted from a base station. The broadcast message may include PRACH configuration information and supplementary resource indication information. The PRACH configuration information may include first indication information for characterizing first physical resource and second indication information for characterizing random access preamble sequence. The supplementary resource indication information may be used for characterizing second physical resource. The one or more processors may further be configured to obtain a location of a first reference SSB synchronization signal according to the first physical resource corresponding to the PRACH configuration information. The first reference SSB synchronization signal may be at a synchronization signal transmission period most proximate to the first physical resource and before the first physical resource. The one or more processors may further be configured to transmit the random access preamble sequence to the base station by using the second physical resource corresponding to the supplementary resource indication information when no first reference SSB synchronization signal is detected on physical resource occupied by the first reference SSB synchronization signal.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute part of this specification, illustrate embodiments consistent with the disclosure and, together with the description, serve to explain the principles of the disclosure.

DETAILED DESCRIPTION

Figure 1:
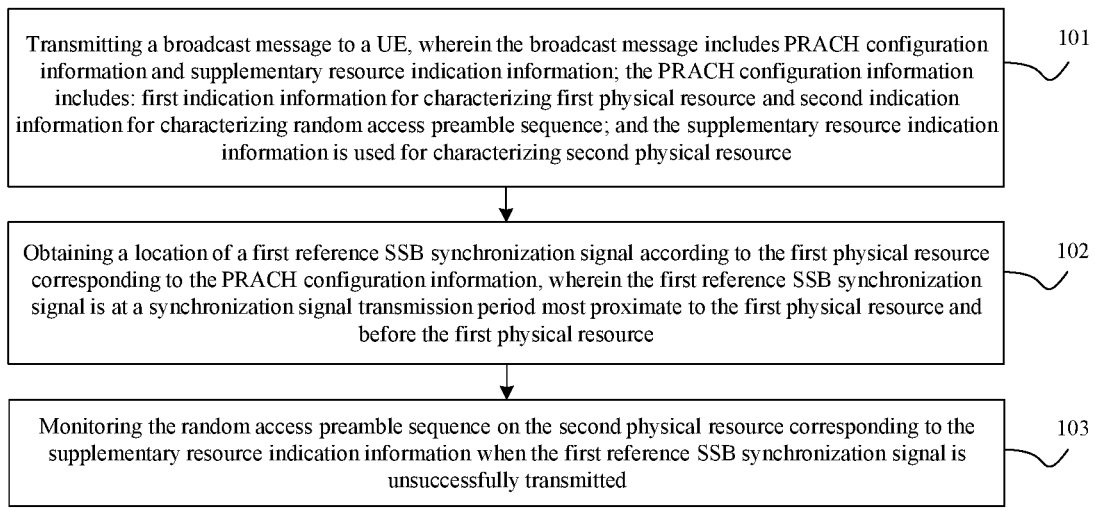
FIG. 1 is a flowchart showing a method of random access according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the related technology, random access is an important new feature of separate networking scheme for unauthorized cells, and in the first step of the random access process, the process of sending an uplink preamble by the UE according to the PRACH resource configured by the cell broadcast may be affected by LBT. Meanwhile, if the UE uses LBT of access ability Category 4 (CAT4), which has a lower priority, in the uplink, power consumption of the UE and success rate of PRACH transmission will be greatly affected, and even if the UE adopts a faster LBT mechanism in the uplink, the channel may still be occupied, thus the PRACH cannot be sent. Further, fixed PRACH configuration corresponds to fixed resource, and the access rate will be decreased if too few resource are provided while the system efficiency will be decreased if too much resource are provided, this is because that the PRACH resource reserved by the base station cannot be used to allocate other resource, therefore, if spare PRACH resource exist all the time, there is no substantive difference from increasing PRACH resource, resulting in resource waste.

To solve the above-mentioned problems, an embodiment of the present disclosure provides a method of random access, applied to a base station, such as an NRU base station. The method includes: transmitting a broadcast message to a UE, wherein the broadcast message includes PRACH configuration information and supplementary resource indication information, the PRACH configuration information includes: first indication information for characterizing first physical resource and second indication information for characterizing a random access preamble sequence, and the supplementary resource indication information is used for characterizing second physical resource; determining a location of a first reference synchronization broadcast block (SSB, SS/PBCH Block) synchronization signal according to the first physical resource corresponding to the PRACH configuration information, wherein the first reference SSB synchronization signal is at a synchronization signal transmission period most proximate to the first physical resource and before the first physical resource; and monitoring the random access preamble sequence on the second physical resource corresponding to the supplementary resource indication information when the first reference SSB synchronization signal is unsuccessfully transmitted. The method of random access provided by the embodiment of the present disclosure adds the supplementary resource indication information for characterizing the second physical resource based on the PRACH configuration, but the second physical resource is not continuously occupied and the second physical resource can be enabled only when certain conditions are satisfied, that is, when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

It should be noted that the user equipment involved in the embodiments of the present disclosure may, for example, include electronic devices such as smartphones, tablet PCs, desktops, notebook computers, drones or wearable devices (e.g. bracelets, smart glasses, etc.).

Based on the above-described analysis, the following specific embodiments will be proposed.

FIG. 1 is a flowchart showing a method of random access according to an example of the present disclosure. The execution subject of the method of random access in the embodiment of the present disclosure may be a base station of a cellular network. As shown in FIG. 1, the method includes the following steps 101-103:

In step 101, a broadcast message is sent to a UE, wherein the broadcast message includes PRACH configuration information and supplementary resource indication information; the PRACH configuration information includes: first indication information for characterizing first physical resource and second indication information for characterizing the random access preamble sequence; and the supplementary resource indication information is used for characterizing second physical resource.

Exemplarily, the PRACH configuration information is configuration information assigned by the base station and fixed for the user equipment to perform uplink PRACH configuration. The present disclosure adds the supplementary resource indication information for characterizing the second physical resource based on the PRACH configuration, but the second physical resource is not always enabled or continuously occupied by PRACH, and the second physical resource can be enabled only when certain conditions are satisfied, that is, as mentioned in step 103: when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource.

Exemplarily, a time interval between the second physical resource corresponding to the supplementary resource indication information and the first physical resource corresponding to the PRACH configuration information is equal to a predetermined time-domain offset. That is to say, there is a time-domain offset in time-domain between the second physical resource and the first physical resource, and the time-domain offset is set by the system in advance. The base station may determine the second physical resource according to the first physical resource and the preset time-domain offset, for example, the second physical resource may be determined by shifting the first physical resource backward in the time-domain (the size of shifting is equal to the time-domain offset).

Exemplarily, after the base station sends the broadcast message, the broadcast message sent from the base station will be received by the UE, and the UE obtains the PRACH configuration information and the supplementary resource indication information by parsing the broadcast message.

Exemplarily, the broadcast message further includes: Tracking Reference Signal (TRS) configuration information, composed of a set of pseudo-random sequences, for the UE to perform secondary synchronization; and third physical resource indicated by the TRS configuration information precedes the second physical resource corresponding to the supplementary resource indication information.

In step 102, a location of a first reference SSB synchronization signal is obtained according to the first physical resource corresponding to the PRACH configuration information, wherein the first reference SSB synchronization signal is at a synchronization signal transmission period most proximate to the first physical resource and before the first physical resource.

Exemplarily, the base station and the UE obtain the location of the first reference SSB synchronization signal based on the first physical resource corresponding to the PRACH configuration information, wherein the first reference SSB synchronization signal is at the synchronization signal transmission period most proximate to the first physical resource and before the first physical resource.

In step 103, when the first reference SSB synchronization signal is unsuccessfully sent, the random access preamble sequence is monitored on the second physical resource corresponding to the supplementary resource indication information.

Exemplarily, when the transmission of the first reference SSB synchronization signal fails due to the LTB failure in preparation for the transmission of the first reference SSB synchronization signal, the base station determines that the first reference SSB synchronization signal is unsuccessfully sent, then the base station enables the second physical resource corresponding to the supplementary resource indication information, and monitors the random access preamble sequence on the second physical resource.

For example, when the base station determines that the transmission of the first reference SSB synchronization signal fails, the first reference SSB synchronization signal will not be detected by the UE on the physical resource occupied by the first reference SSB synchronization signal; and when no first reference SSB synchronization signal is detected by the UE on the physical resource occupied by the first reference SSB synchronization signal, the UE will use the second physical resource corresponding to the supplementary resource indication information to send the random access preamble sequence to the base station; and accordingly, when the base station determines that the transmission of the first reference SSB synchronization signal fails, the base station will monitor the random access preamble sequence on the second physical resource corresponding to the supplementary resource indication information.

By using the technical solution provided by the embodiment of the present disclosure, the supplementary resource indication information for characterizing the second physical resource is added based on the PRACH configuration, but the second physical resource is not continuously occupied, and the second physical resource can be enabled only when certain conditions are satisfied. That is, when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Figure 2:
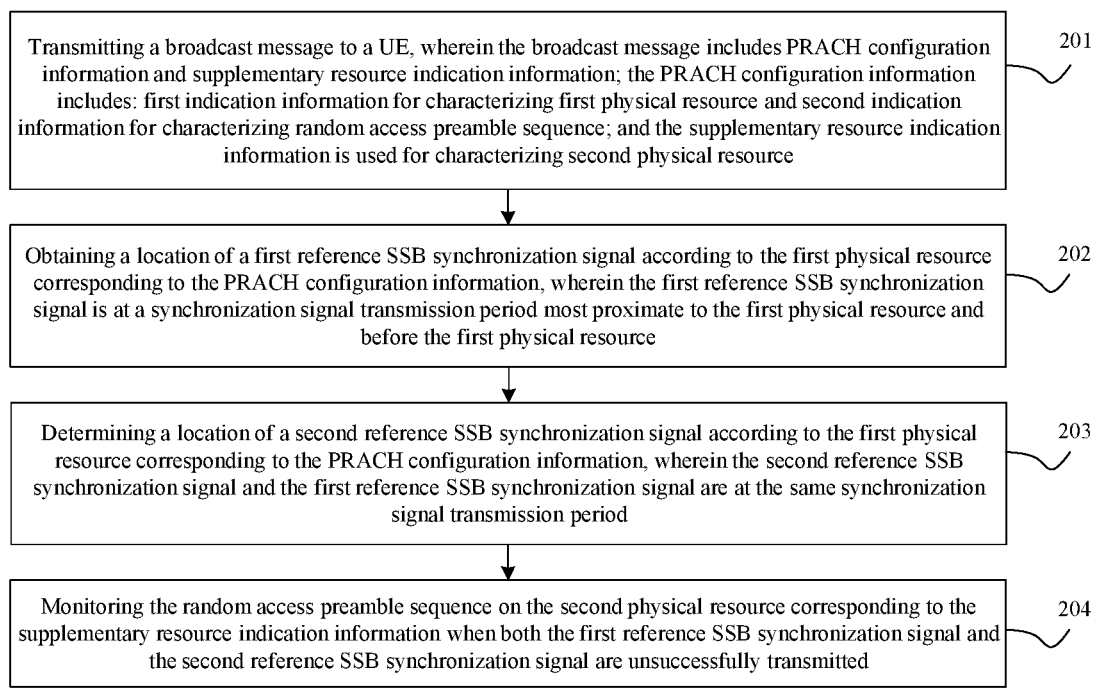
FIG. 2 is a flowchart showing a method of random access according to an example of the present disclosure.

FIG. 2 is a flowchart showing a method of random access according to an example of the present disclosure. Based on the above embodiment, the method shown in FIG. 2 includes the following steps 201-204, wherein, for parts not described in detail in this embodiment, please refer to the corresponding description of the embodiment of FIG. 1.

In step 201, the broadcast message is sent to the UE, wherein the broadcast message includes the PRACH configuration information and the supplementary resource indication information; the PRACH configuration information includes: first indication information for characterizing the first physical resource and the second indication information for characterizing the random access preamble sequence; and the supplementary resource indication information is used for characterizing the second physical resource.

In step 202, the location of the first reference SSB synchronization signal is obtained according to the first physical resource corresponding to the PRACH configuration information, wherein the first reference SSB synchronization signal is at the synchronization signal transmission period most proximate to the first physical resource and before the first physical resource.

In step 203, a location of a second reference SSB synchronization signal is determined based on the first physical resource corresponding to the PRACH configuration information, wherein the second reference SSB synchronization signal and the first reference SSB synchronization signal are located at the same synchronization signal transmission period.

Exemplarily, the perform time of the step 202 has no correlation with that of the 203, the step 202 may be performed before the step 203, or the step 203 may be performed before the step 202, or the steps 202 and 203 may be performed simultaneously.

In step 204, when both the first reference SSB synchronization signal and the second reference SSB synchronization signal are unsuccessfully sent, the random access preamble sequence is monitored on the second physical resource corresponding to the supplementary resource indication information.

Using the technical solution provided by the embodiments of the present disclosure, when the most proximate SSB synchronization signal before the first physical resource corresponding to the PRACH configuration information is unsuccessfully sent, and the second reference SSB synchronization signal that is in the same synchronization signal transmission period as that of the first reference SSB synchronization signal is unsuccessfully sent too, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Figure 3:
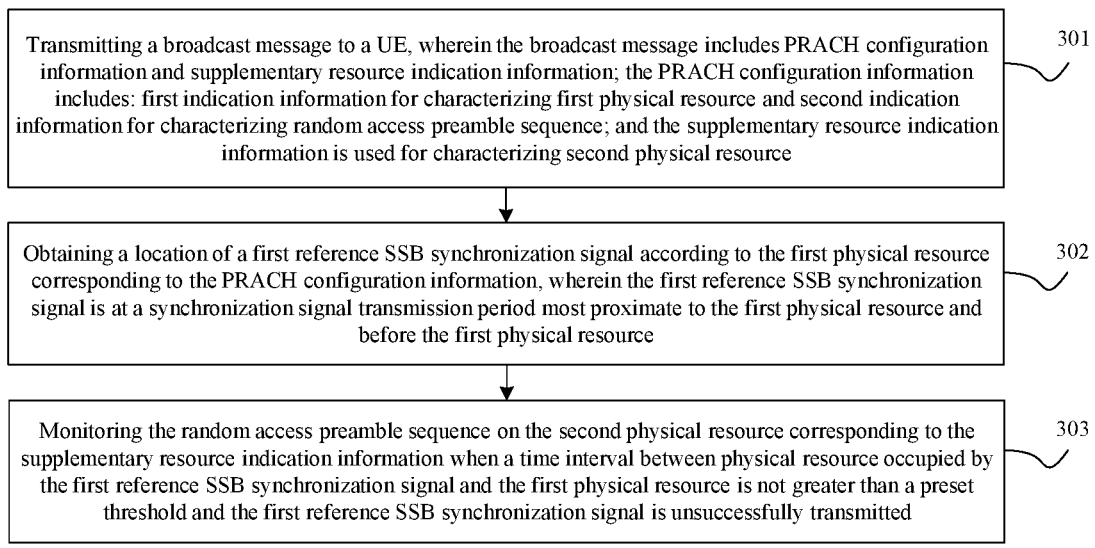
FIG. 3 is a flowchart showing a method of random access according to an example of the present disclosure.

FIG. 3 is a flowchart showing a method of random access according to an example of the present disclosure. Based on the above embodiment, the method shown in FIG. 3 includes the following steps 301-303, wherein, for parts not described in detail in this embodiment, please refer to the corresponding description of the embodiment of FIG. 1.

In step 301, the broadcast message is sent to the UE, wherein the broadcast message includes the PRACH configuration information and the supplementary resource indication information; the PRACH configuration information includes: first indication information for characterizing the first physical resource and the second indication information for characterizing the random access preamble sequence; and the supplementary resource indication information is used for characterizing the second physical resource.

In step 302, the location of the first reference SSB synchronization signal is obtained according to the first physical resource corresponding to the PRACH configuration information, wherein the first reference SSB synchronization signal is at the synchronization signal transmission period most proximate to the first physical resource and before the first physical resource.

In step 303, when a time interval between the physical resource occupied by the first reference SSB synchronization signal and the first physical resource is not greater than a predetermined threshold, and the first reference SSB synchronization signal is unsuccessfully sent, the random access preamble sequence is monitored on the second physical resource corresponding to the supplementary resource indication information.

Exemplarily, the preset threshold is, for example, a number N of system frames, which is set in advance.

With the technical solution provided by the embodiment of the present disclosure, only when the time interval between the first reference SSB synchronization signal location and the first physical resource is not greater than the preset threshold, and the first reference SSB synchronization signal is unsuccessfully sent, the random access preamble sequence can be monitored on the second physical resource corresponding to the supplementary resource indication information; and when the time interval between the first reference SSB synchronization signal location and the first physical resource is greater than the preset threshold, due to the larger distance, whether the first physical resource is occupied or not is less related to the LTB failure in preparation for the transmission of the first reference SSB synchronization signal, thus the second physical resource is not enabled at this time, so as to avoid resource waste, and to save power of the UE.

Figure 4:
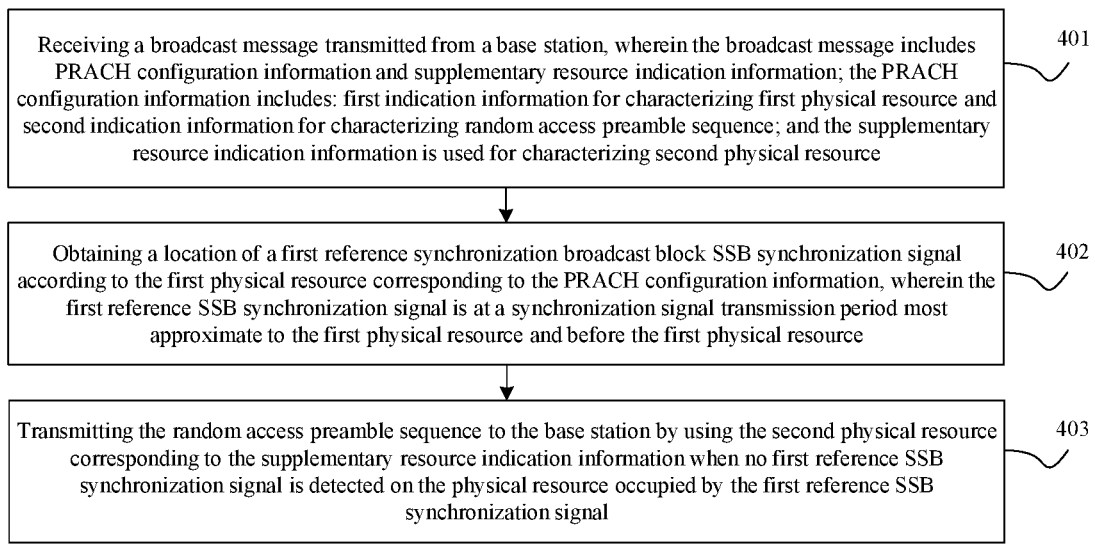
FIG. 4 is a flowchart showing a method of random access according to an example of the present disclosure.

FIG. 4 is a flowchart showing a method of random access according to an example of the present disclosure. The execution subject of the method of random access in the embodiment of the present disclosure may be a UE. As shown in FIG. 4, the method includes the following steps 401-403:

In step 401, the broadcast message sent from the base station is received, wherein the broadcast message includes physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource.

Exemplarily, the time interval between the first physical resource corresponding to the PRACH configuration information and the second physical resource corresponding to the supplementary resource indication information is equal to a preset time-domain offset.

Exemplarily, the broadcast message further includes: TRS configuration information, for the UE to perform secondary synchronization, wherein the third physical resource indicated by the TRS configuration information precedes the second physical resource corresponding to the supplementary resource indication information.

In step 402, the location of the first reference SSB synchronization signal is obtained according to the first physical resource corresponding to the PRACH configuration information, wherein the first reference SSB synchronization signal is at the synchronization signal transmission period most proximate to the first physical resource and before the first physical resource.

In step 403, when no first reference SSB synchronization signal is detected on the physical resource occupied by the first reference SSB synchronization signal, the second physical resource corresponding to the supplementary resource indication information is used to send the random access preamble sequence to the base station.

Exemplarily, the UE may further determine the location of the second reference SSB synchronization signal based on the first physical resource corresponding to the PRACH configuration information, wherein the second reference SSB synchronization signal and the first reference SSB synchronization signal are located at the same synchronization signal transmission period. When no first reference SSB synchronization signal is detected on the physical resource occupied by the first reference SSB synchronization signal, and no second reference SSB synchronization signal is detected on the physical resource occupied by the second reference SSB synchronization signal, the UE uses the second physical resource corresponding to the supplementary resource indication information to send the random access preamble sequence to the base station.

Exemplarily, SSBs are transmitted periodically and each SSB period may include a plurality of SSBs, in a beam system, the UE generally tracks one of the SSBs and marks it as SSB-1. In a NRU system, there may be spare SSBs, and when the SSB-1 tracked by the UE is unsuccessfully sent due to the LBT failure, the UE detects a spare SSB on the physical resource occupied by the spare SSB according to protocol.

Exemplarily, when the time interval between the physical resource occupied by the first reference SSB synchronization signal and the first physical resource is not greater than the preset threshold, and no first reference SSB synchronization signal is detected on the physical resource occupied by the first reference SSB synchronization signal, the second physical resource corresponding to the supplementary resource indication information is used to send the random access preamble sequence to the base station.

By using the technical solution provided by the embodiment of the present disclosure, the supplementary resource indication information for characterizing the second physical resource is added based on the PRACH configuration, but the second physical resource is not continuously occupied, and the second physical resource can be enabled only when certain conditions are satisfied. That is, when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Figure 5:
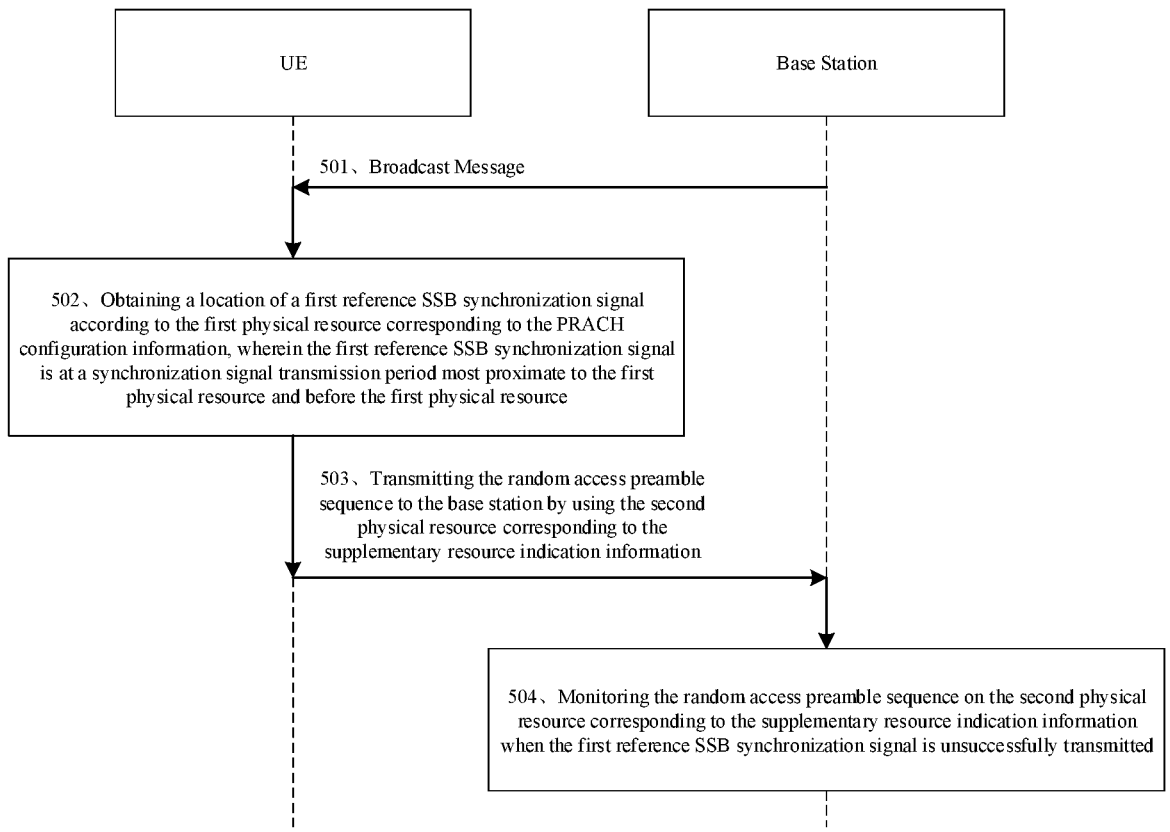
FIG. 5 is a flowchart showing a method of random access according to an example of the present disclosure.

FIG. 5 is a flowchart showing a method of random access according to an example of the present disclosure. The method of random access in the embodiment of the present disclosure is performed by the base station and the UE which cooperate with each other. As shown in FIG. 5, the method includes the following steps 501-504:

In step 501, the base station sends the broadcast message to the UE, wherein the broadcast message includes the PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource.

Exemplarily, the base station obtains the location of the first reference SSB synchronization signal according to the first physical resource corresponding to the PRACH configuration information, wherein the first reference SSB synchronization signal is at the synchronization signal transmission period most proximate to the first physical resource and before the first physical resource.

In step 502, the broadcast message sent from the base station is received by the UE, and the US obtains the location of the first reference SSB synchronization signal according to the first physical resource corresponding to the PRACH configuration information, wherein the first reference SSB synchronization signal is at the synchronization signal transmission period most proximate to the first physical resource and before the first physical resource.

In step 503, when no first reference SSB synchronization signal is detected on the physical resource occupied by the first reference SSB synchronization signal, the UE sends the random access preamble sequence to the base station by using the second physical resource corresponding to the supplementary resource indication information.

In step 504, when the first reference SSB synchronization signal is unsuccessfully sent, the base station monitors the random access preamble sequence on the second physical resource corresponding to the supplementary resource indication information.

By using the technical solution provided by the embodiment of the present disclosure, the supplementary resource indication information for characterizing the second physical resource is added based on the PRACH configuration, but the second physical resource is not continuously occupied, and the second physical resource can be enabled only when certain conditions are satisfied. That is, when no first reference SSB synchronization signal is detected on the physical resource occupied by the first reference SSB synchronization signal, the UE sends the random access preamble sequence to the base station by using the second physical resource corresponding to the supplementary resource indication information; and when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Device embodiments of the present disclosure for performing the method embodiments of the present disclosure will be described below. For parts of the device embodiments that are not described in detail, reference can be made to the method embodiments.

Figure 6:
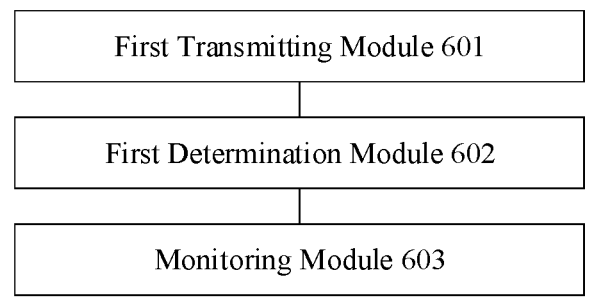
FIG. 6 is a block diagram illustrating a device of random access according to an example of the present disclosure.

FIG. 6 is a block diagram illustrating a device of random access according to an example of the present disclosure. The device may be applied to the base station. Referring to FIG. 6, the device of random access includes: a first transmitting module 601, a first determination module 602 and a monitoring module 603, wherein:

the first transmitting module 601 is configured to send the broadcast message to the UE, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource;

the first determination module 602 is configured to obtain the location of the first reference SSB synchronization signal according to the first physical resource corresponding to the PRACH configuration information, wherein the first reference SSB synchronization signal is at the synchronization signal transmission period most proximate to the first physical resource and before the first physical resource; and the monitoring module 603 is configured to monitor the random access preamble sequence on the second physical resource corresponding to the supplementary resource indication information when the first reference SSB synchronization signal is unsuccessfully sent.

By using the technical solution provided by the embodiment of the present disclosure, the supplementary resource indication information for characterizing the second physical resource is added based on the PRACH configuration, but the second physical resource is not continuously occupied, and the second physical resource can be enabled only when certain conditions are satisfied. That is, when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Figure 7:
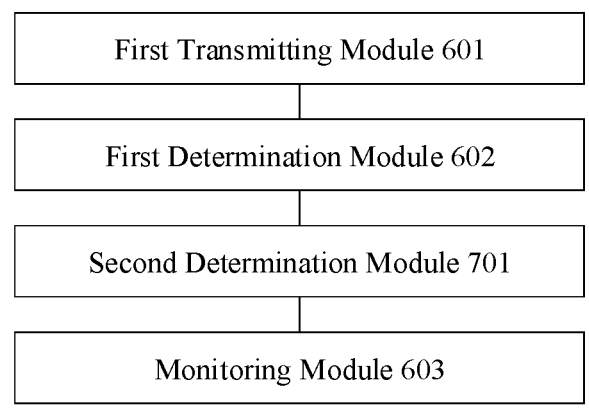
FIG. 7 is a block diagram illustrating a device of random access according to an example of the present disclosure.

In one embodiment, as shown in FIG. 7, the device of random access illustrated in FIG. 6 may further include: a second determination module 701, configured to determine the location of the second reference SSB synchronization signal according to the first physical resource corresponding to the PRACH configuration information, wherein the second reference SSB synchronization signal and the first reference SSB synchronization signal are at the same synchronization signal transmission period.

The monitoring module 603 is configured to monitor the random access preamble sequence on the second physical resource corresponding to the supplementary resource indication information when both the first reference SSB synchronization signal and the second reference SSB synchronization signal are unsuccessfully sent.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, the monitoring module 603 is configured to monitor the random access preamble sequence on the second physical resource corresponding to the supplementary resource indication information when the time interval between the physical resource occupied by the first reference SSB synchronization signal and the first physical resource is not greater than the preset threshold and the first reference SSB synchronization signal is unsuccessfully sent.

Figure 8:
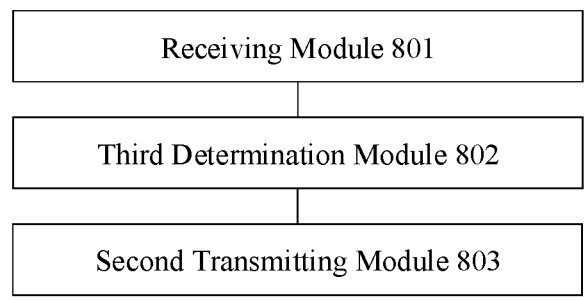
FIG. 8 is a block diagram illustrating a device of random access according to an example of the present disclosure.

FIG. 8 is a block diagram illustrating a device of random access according to an example of the present disclosure. The device may be applied to the UE. Referring to FIG. 8, the device of random access includes: a receiving module 801, a third determination module 802 and a second transmitting module 803.

The receiving module 801 is configured to receive the broadcast message sent from the base station, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource.

The third determination module 802 is configured to obtain the location of the first reference SSB synchronization signal according to the first physical resource corresponding to the PRACH configuration information, wherein the first reference SSB synchronization signal is at the synchronization signal transmission period most proximate to the first physical resource and before the first physical resource.

The second transmitting module 803 is configured to send the random access preamble sequence to the base station by using the second physical resource corresponding to the supplementary resource indication information when no first reference SSB synchronization signal is detected on the physical resource occupied by the first reference SSB synchronization signal.

By using the technical solution provided by the embodiment of the present disclosure, the supplementary resource indication information for characterizing the second physical resource is added based on the PRACH configuration, but the second physical resource is not continuously occupied, and the second physical resource can be enabled only when certain conditions are satisfied. That is, when the most proximate SSB synchronization signal before the first physical resource corresponding to the PRACH configuration information is unsuccessfully sent, the base station determines that the first physical resource corresponding to the PRACH configuration information has been occupied, then the base station enables the second physical resource and monitors the random access preamble sequence on the second physical resource, thereby realizing to increase the chance of sending the random access preamble sequence without significantly increasing system resource, which can improve success rate of UE, reduce UE power consumption and improve resource utilization.

Figure 9:
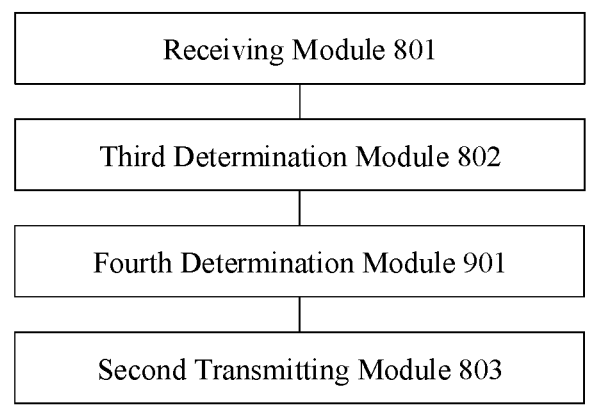
FIG. 9 is a block diagram illustrating a device of random access according to an example of the present disclosure.

In an embodiment, as shown in FIG. 9, the device of random access illustrated in FIG. 8 may further include: a fourth determination module 901, configured to determine the location of the second reference SSB synchronization signal according to the first physical resource corresponding to the PRACH configuration information, wherein the second reference SSB synchronization signal and the first reference SSB synchronization signal are at the same synchronization signal transmission period.

The second transmitting module 803 is configured to transmit the random access preamble sequence to the base station by using the second physical resource corresponding to the supplementary resource indication information when no first reference SSB synchronization signal is detected on the physical resource occupied by the first reference SSB synchronization signal and no second reference SSB synchronization signal is detected on the physical resource occupied by the second reference SSB synchronization signal.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, the second transmitting module 803 is configured to send the random access preamble sequence to the base station by using the second physical resource corresponding to the supplementary resource indication information when the time interval between the physical resource occupied by the first reference SSB synchronization signal and the first physical resource is not greater than the preset threshold and no first reference SSB synchronization signal is detected on the physical resource occupied by the first reference SSB synchronization signal.

Figure 10:
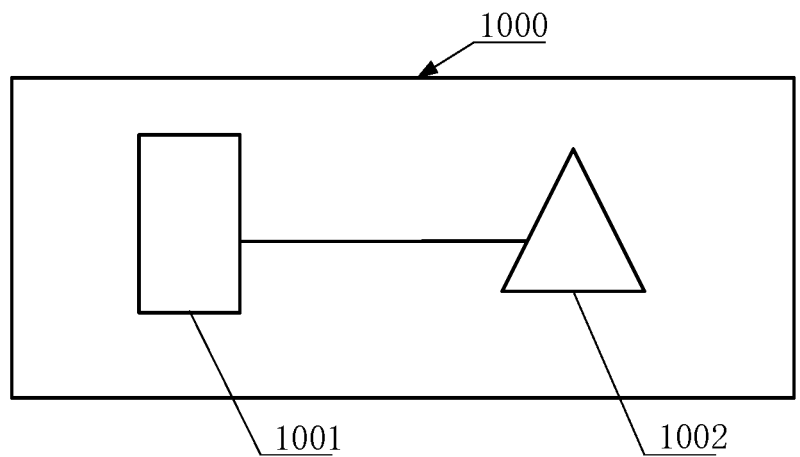
FIG. 10 is a block diagram illustrating a device of random access according to an example of the present disclosure.

FIG. 10 is a block diagram illustrating a device of random access 1000 according to an example of the present disclosure, which is applied to a base station. The device of random access 1000 includes:

a processor 1001; and
a memory 1002 for storing instructions executed by the processor 1001,
wherein the processor 1001 is configured to:
send the broadcast message to the UE, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource;
obtain the location of the first reference SSB synchronization signal according to the first physical resource corresponding to the PRACH configuration information, wherein the first reference SSB synchronization signal is at the synchronization signal transmission period most proximate to the first physical resource and before the first physical resource; and
monitor the random access preamble sequence on the second physical resource corresponding to the supplementary resource indication information when the first reference SSB synchronization signal is unsuccessfully sent.

In an embodiment, the above processor 1001 may be further configured to:
determine the location of the second reference SSB synchronization signal according to the first physical resource corresponding to the PRACH configuration information, wherein the second reference SSB synchronization signal and the first reference SSB synchronization signal are at the same synchronization signal transmission period,
wherein monitoring the random access preamble sequence on the second physical resource corresponding to the supplementary resource indication information when the first reference SSB synchronization signal is unsuccessfully sent, includes:
monitoring the random access preamble sequence on the second physical resource corresponding to the supplementary resource indication information when both the first reference SSB synchronization signal and the second reference SSB synchronization signal are unsuccessfully sent.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, the above processor 1001 may be further configured to: monitor the random access preamble sequence on the second physical resource corresponding to the supplementary resource indication information when the time interval between the physical resource occupied by the first reference SSB synchronization signal and the first physical resource is not greater than the preset threshold and the first reference SSB synchronization signal is unsuccessfully sent.

Figure 11:
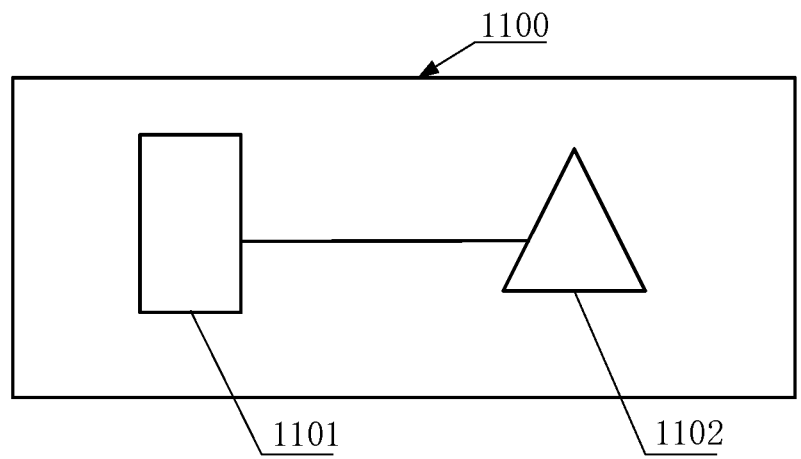
FIG. 11 is a block diagram illustrating a device of random access according to an example of the present disclosure.

FIG. 11 is a block diagram illustrating a device of random access 1100 according to an example of the present disclosure, which is applied to the UE. The device of random access 1100 includes:

a processor 1101; and
a memory 1102 for storing instructions executed by the processor 1101,
wherein the processor 1101 is configured to:
receive the broadcast message sent from the base station, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource;
obtain the location of the first reference synchronization broadcast block SSB synchronization signal according to the first physical resource corresponding to the PRACH configuration information, wherein the first reference SSB synchronization signal is at the synchronization signal transmission period most proximate to the first physical resource and before the first physical resource; and send the random access preamble sequence to the base station by using the second physical resource corresponding to the supplementary resource indication information when no first reference SSB synchronization signal is detected on the physical resource occupied by the first reference SSB synchronization signal.

In an embodiment, the above processor 1101 may be further configured to:

determine the location of the second reference SSB synchronization signal according to the first physical resource corresponding to the PRACH configuration information, wherein the second reference SSB synchronization signal and the first reference SSB synchronization signal are at the same synchronization signal transmission period, wherein sending the random access preamble sequence to the base station by using the second physical resource corresponding to the supplementary resource indication information when no first reference SSB synchronization signal is detected on the physical resource occupied by the first reference SSB synchronization signal, includes:

transmitting the random access preamble sequence to the base station by using the second physical resource corresponding to the supplementary resource indication information when no first reference SSB synchronization signal is detected on the physical resource occupied by the first reference SSB synchronization signal and no second reference SSB synchronization signal is detected on the physical resource occupied by the second reference SSB synchronization signal.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, the above processor 1101 may be further configured to: send the random access preamble sequence to the base station by using the second physical resource corresponding to the supplementary resource indication information when the time interval between the physical resource occupied by the first reference SSB synchronization signal and the first physical resource is not greater than a preset threshold and no first reference SSB synchronization signal is detected on the physical resource occupied by the first reference SSB synchronization signal.

With respect to the devices in the above embodiments, the specific manners for performing operations for individual modules have been described in detail in the embodiments regarding the methods, which will not be elaborated herein.

Figure 12:
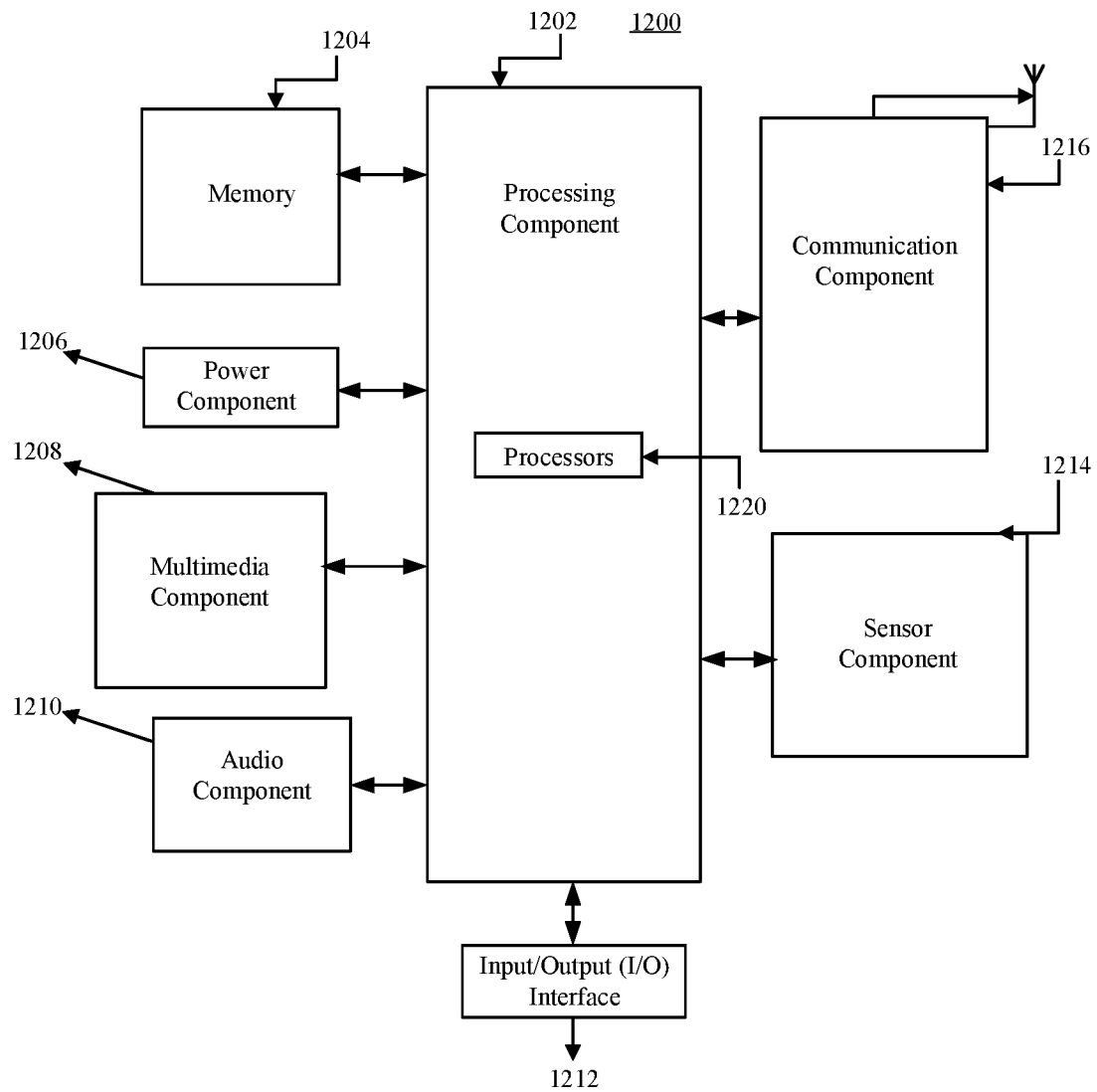
FIG. 12 is a block diagram illustrating a device of random access according to an example of the present disclosure.

FIG. 12 is a block diagram illustrating a device of random access according to an example of the present disclosure. The device of random access 1200 is applicable for the UE. The device of random access 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device of random access 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device of random access 1200. Examples of such data include instructions for any applications or methods operated on the device of random access 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device of random access 1200. The power component 1206 may include a power management system, one or more power sources, and any other components associated with the generation, management, and distribution of power in the device of random access 1200.

The multimedia component 1208 includes a screen providing an output interface between the device of random access 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device of random access 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the device of random access 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device of random access 1200. For instance, the sensor component 1214 may detect an open/closed status of the device of random access 1200, relative positioning of components, e.g., the display and the keypad, of the device of random access 1200, a change in position of the device of random access 1200 or a component of the device of random access 1200, a presence or absence of user contact with the device of random access 1200, an orientation or an acceleration/deceleration of the device of random access 1200, and a change in temperature of the device of random access 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device of random access 1200 and other devices. The device of random access 1200 can access a wireless network based on a communication standard, such as WiFi, 2G/3G/4G/5G, or a combination thereof. In one example, the communication component 1216 receives a broadcast signal or broadcast associated information from an external broadcast management system via a broadcast channel. In one example, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device of random access 1200 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above described methods.

In examples, there is also provided a non-transitory computer-readable storage medium including instructions, such as included in the memory 1204, executable by the processor 1220 in the device of random access 1200, for performing the above-described methods. For example, the non-transitory computer-readable storage medium may be a ROM, a RAM, a CD-ROM, a magnetic tape, a floppy disc, an optical data storage device, and the like.

The instructions in the storage medium, when executed by the processor, enable the device of random access 1200 to perform the following method, including:

receiving the broadcast message sent from the base station, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource;

obtaining the location of the first reference SSB synchronization signal according to the first physical resource corresponding to the PRACH configuration information, wherein the first reference SSB synchronization signal is at the synchronization signal transmission period most proximate to the first physical resource and before the first physical resource; and sending the random access preamble sequence to the base station by using the second physical resource corresponding to the supplementary resource indication information when no first reference SSB synchronization signal is detected on the physical resource occupied by the first reference SSB synchronization signal.

In one embodiment, the method further includes:

determining the location of the second reference SSB synchronization signal according to the first physical resource corresponding to the PRACH configuration information, wherein the second reference SSB synchronization signal and the first reference SSB synchronization signal are at the same synchronization signal transmission period; and sending the random access preamble sequence to the base station by using the second physical resource corresponding to the supplementary resource indication information when no first reference SSB synchronization signal is detected on the physical resource occupied by the first reference SSB synchronization signal includes:

transmitting the random access preamble sequence to the base station by using the second physical resource corresponding to the supplementary resource indication information when no first reference SSB synchronization signal is detected on the physical resource occupied by the first reference SSB synchronization signal and no second reference SSB synchronization signal is detected on the physical resource occupied by the second reference SSB synchronization signal.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, sending the random access preamble sequence to the base station by using the second physical resource corresponding to the supplementary resource indication information when no first reference SSB synchronization signal is detected on the physical resource occupied by the first reference SSB synchronization signal, includes:

sending the random access preamble sequence to the base station by using the second physical resource corresponding to the supplementary resource indication information when the time interval between the physical resource occupied by the first reference SSB synchronization signal and the first physical resource is not greater than the preset threshold and no first reference SSB synchronization signal is detected on the physical resource occupied by the first reference SSB synchronization signal.

Figure 13:
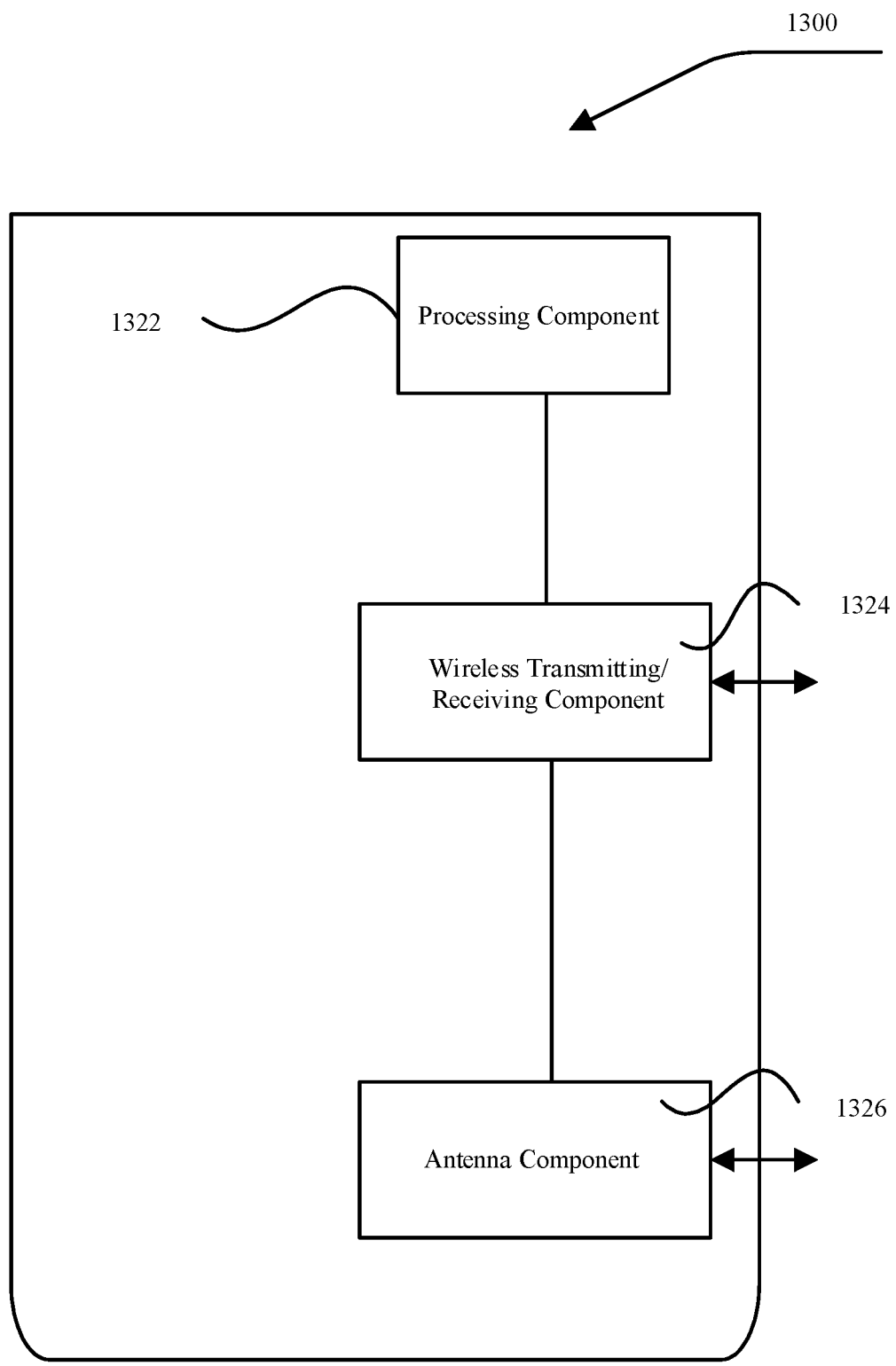
FIG. 13 is a block diagram illustrating a device of random access according to an example of the present disclosure.

FIG. 13 is a block diagram illustrating a device of random access according to an example of the present disclosure. As shown in FIG. 13, the device of random access 1300 may be provided as a base station in a cellular network. Referring to FIG. 13, the device of random access 1300 includes a processing component 1322, a wireless transmitting/receiving component 1324, an antenna component 1326, and a signal processing portion specific to the wireless interface, and the processing component 1322 may further include one or more processors.

One of the processors of the processing component 1322 may be configured to perform the following method, including:

sending the broadcast message to the UE, wherein the broadcast message includes the physical random access channel PRACH configuration information and the supplementary resource indication information; the PRACH configuration information includes: the first indication information for characterizing the first physical resource and the second indication information for characterizing the random access preamble sequence; and the supplementary resource indication information is used for characterizing the second physical resource;

obtaining the location of the first reference SSB synchronization signal according to the first physical resource corresponding to the PRACH configuration information, wherein the first reference SSB synchronization signal is at the synchronization signal transmission period most proximate to the first physical resource and before the first physical resource; and monitoring the random access preamble sequence on the second physical resource corresponding to the supplementary resource indication information when the first reference SSB synchronization signal is unsuccessfully sent.

In an embodiment, the method further includes:

determining the location of the second reference SSB synchronization signal according to the first physical resource corresponding to the PRACH configuration information, wherein the second reference SSB synchronization signal and the first reference SSB synchronization signal are at the same synchronization signal transmission period, wherein monitoring the random access preamble sequence on the second physical resource corresponding to the supplementary resource indication information when the first reference SSB synchronization signal is unsuccessfully sent, includes:

monitoring the random access preamble sequence on the second physical resource corresponding to the supplementary resource indication information when both the first reference SSB synchronization signal and the second reference SSB synchronization signal are unsuccessfully sent.

In an embodiment, the time interval between the first physical resource corresponding to the PRACH configuration information and the second physical resource corresponding to the supplementary resource indication information is equal to the preset time-domain offset.

In an embodiment, the broadcast message further includes: the TRS configuration information, for the UE to perform secondary synchronization, wherein the third physical resource indicated by the TRS configuration information precedes the second physical resource corresponding to the supplementary resource indication information.

In an embodiment, monitoring the random access preamble sequence on the second physical resource corresponding to the supplementary resource indication information when the first reference SSB synchronization signal is unsuccessfully sent, includes:

monitoring the random access preamble sequence on the second physical resource corresponding to the supplementary resource indication information when the time interval between the physical resource occupied by the first reference SSB synchronization signal and the first physical resource is not greater than a preset threshold and the first reference SSB synchronization signal is unsuccessfully sent.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of random access, applied to a base station, and comprising:

transmitting a broadcast message to a user equipment (UE), wherein the broadcast message comprises physical random access channel (PRACH) configuration information and supplementary resource indication information; wherein the PRACH configuration information comprises:

first indication information for characterizing first physical resource and second indication information for characterizing a random access preamble sequence; and wherein the supplementary resource indication information is used for characterizing second physical resource;

obtaining a location of a first reference synchronization broadcast block (SSB) synchronization signal according to the first physical resource corresponding to the PRACH configuration information, wherein the first reference SSB synchronization signal is at a synchronization signal transmission period most proximate to the first physical resource and before the first physical resource; and monitoring the random access preamble sequence on the second physical resource corresponding to the supplementary resource indication information when the first reference SSB synchronization signal is unsuccessfully transmitted.

2. The method as claimed in claim 1, further comprising:

determining a location of a second reference SSB synchronization signal according to the first physical resource corresponding to the PRACH configuration information, wherein the second reference SSB synchronization signal and the first reference SSB synchronization signal are at the same synchronization signal transmission period, wherein monitoring the random access preamble sequence on the second physical resource corresponding to the supplementary resource indication information when the first reference SSB synchronization signal is unsuccessfully transmitted comprises:
monitoring the random access preamble sequence on the second physical resource corresponding to the supplementary resource indication information when both the first reference SSB synchronization signal and the second reference SSB synchronization signal are unsuccessfully transmitted.

3. The method as claimed in claim 1, wherein a time interval between the first physical resource corresponding to the PRACH configuration information and the second physical resource corresponding to the supplementary resource indication information is equal to a preset time-domain offset.

4. The method as claimed in claim 1, wherein the broadcast message further comprises tracking reference signal (TRS) configuration information for the UE to perform secondary synchronization, wherein third physical resource indicated by the TRS configuration information precedes the second physical resource corresponding to the supplementary resource indication information.

5. The method as claimed in claim 1, wherein monitoring the random access preamble sequence on the second physical resource corresponding to the supplementary resource indication information when the first reference SSB synchronization signal is unsuccessfully transmitted comprises:
monitoring the random access preamble sequence on the second physical resource corresponding to the supplementary resource indication information when a time interval between physical resource occupied by the first reference SSB synchronization signal and the first physical resource is not greater than a preset threshold and the first reference SSB synchronization signal is unsuccessfully transmitted.

6. A method of random access, applied to a user equipment UE, and comprising:
receiving a broadcast message transmitted from a base station, wherein the broadcast message comprises physical random access channel (PRACH) configuration information and supplementary resource indication information; wherein the PRACH configuration information comprises:
first indication information for characterizing first physical resource and
second indication information for characterizing a random access preamble sequence; and
wherein the supplementary resource indication information is used for characterizing second physical resource;
obtaining a location of a first reference synchronization broadcast block (SSB) synchronization signal according to the first physical resource corresponding to the PRACH configuration information, wherein the first reference SSB synchronization signal is at a synchronization signal transmission period most proximate to the first physical resource and before the first physical resource; and
transmitting the random access preamble sequence to the base station by using the second physical resource corresponding to the supplementary resource indication information when no first reference SSB synchronization signal is detected on physical resource occupied by the first reference SSB synchronization signal.

7. The method as claimed in claim 6, further comprising:
determining a location of a second reference SSB synchronization signal according to the first physical resource corresponding to the PRACH configuration information, wherein the second reference SSB synchronization signal and the first reference SSB synchronization signal are at the same synchronization signal transmission period,
wherein transmitting the random access preamble sequence to the base station by using the second physical resource corresponding to the supplementary resource indication information when no first reference SSB synchronization signal is detected on the physical resource occupied by the first reference SSB synchronization signal comprises:
transmitting the random access preamble sequence to the base station by using the second physical resource corresponding to the supplementary resource indication information when no first reference SSB synchronization signal is detected on the physical resource occupied by the first reference SSB synchronization signal and no second reference SSB synchronization signal is detected on physical resource occupied by the second reference SSB synchronization signal.

8. The method as claimed in claim 6, wherein a time interval between the first physical resource corresponding to the PRACH configuration information and the second physical resource corresponding to the supplementary resource indication information is equal to a preset time-domain offset.

9. The method as claimed in claim 6, wherein the broadcast message further comprises tracking reference signal (TRS) configuration information for user equipment (UE) to perform secondary synchronization, wherein third physical resource indicated by the TRS configuration information precedes the second physical resource corresponding to the supplementary resource indication information.

10. The method as claimed in claim 6, wherein transmitting the random access preamble sequence to the base station by using the second physical resource corresponding to the supplementary resource indication information when no first reference SSB synchronization signal is detected on the physical resource occupied by the first reference SSB synchronization signal comprises:
transmitting the random access preamble sequence to the base station by using the second physical resource corresponding to the supplementary resource indication information when a time interval between the physical resource occupied by the first reference SSB synchronization signal and the first physical resource is not greater than a preset threshold and no first reference SSB synchronization signal is detected on the physical resource occupied by the first reference SSB synchronization signal.

11. A device, comprising:
one or more processors; and
a non-transitory computer-readable storage medium storing instructions executable by the one or more processors,
wherein the one or more processors are configured to:
transmit a broadcast message to a user equipment (UE), wherein the broadcast message comprises physical random access channel (PRACH) configuration information and supplementary resource indication information; wherein the PRACH configuration information comprises:
first indication information for characterizing first physical resource and
second indication information for characterizing random access preamble sequence; and wherein the supplementary resource indication information is used for characterizing second physical resource;

obtain a location of a first reference synchronization broadcast block (SSB) synchronization signal according to the first physical resource corresponding to the PRACH configuration information, wherein the first reference SSB synchronization signal is at a synchronization signal transmission period most proximate to the first physical resource and before the first physical resource; and monitor the random access preamble sequence on the second physical resource corresponding to the supplementary resource indication information when the first reference SSB synchronization signal is unsuccessfully transmitted.

12. The device as claimed in claim 11, wherein the one or more processors are further configured to:

determine a location of a second reference SSB synchronization signal according to the first physical resource corresponding to the PRACH configuration information, wherein the second reference SSB synchronization signal and the first reference SSB synchronization signal are at the same synchronization signal transmission period, and monitor the random access preamble sequence on the second physical resource corresponding to the supplementary resource indication information when both the first reference SSB synchronization signal and the second reference SSB synchronization signal are unsuccessfully transmitted.

13. The device as claimed in claim 11, wherein a time interval between the first physical resource corresponding to the PRACH configuration information and the second physical resource corresponding to the supplementary resource indication information is equal to a preset time-domain offset.

14. The device as claimed in claim 11, wherein the broadcast message further comprises tracking reference signal (TRS) configuration information for the UE to perform secondary synchronization, wherein third physical resource indicated by the TRS configuration information precedes the second physical resource corresponding to the supplementary resource indication information.

15. The device as claimed in claim 11, wherein the one or more processors are further configured to:

monitor the random access preamble sequence on the second physical resource corresponding to the supplementary resource indication information when a time interval between physical resource occupied by the first reference SSB synchronization signal and the first physical resource is not greater than a preset threshold and the first reference SSB synchronization signal is unsuccessfully transmitted.

16. A device comprising:
one or more processors; and
a non-transitory computer-readable storage medium storing instructions executable by the one or more processors,
wherein the one or more processors are configured to:
receive a broadcast message transmitted from a base station, wherein the broadcast message comprises physical random access channel (PRACH) configuration information and supplementary resource indication information; wherein the PRACH configuration information comprises:

first indication information for characterizing first physical resource and
second indication information for characterizing random access preamble sequence; and
wherein the supplementary resource indication information is used for characterizing second physical resource;
obtain a location of a first reference synchronization broadcast block (SSB) synchronization signal according to the first physical resource corresponding to the PRACH configuration information, wherein the first reference SSB synchronization signal is at a synchronization signal transmission period most proximate to the first physical resource and before the first physical resource; and
transmit the random access preamble sequence to the base station by using the second physical resource corresponding to the supplementary resource indication information when no first reference SSB synchronization signal is detected on physical resource occupied by the first reference SSB synchronization signal.

17. The device as claimed in claim 16, wherein the one or more processors are further configured to:
determine a location of a second reference SSB synchronization signal according to the first physical resource corresponding to the PRACH configuration information, wherein the second reference SSB synchronization signal and the first reference SSB synchronization signal are at the same synchronization signal transmission period, and
transmit the random access preamble sequence to the base station by using the second physical resource corresponding to the supplementary resource indication information when no first reference SSB synchronization signal is detected on the physical resource occupied by the first reference SSB synchronization signal and no second reference SSB synchronization signal is detected on physical resource occupied by the second reference SSB synchronization signal.

18. The device as claimed in claim 16, wherein a time interval between the first physical resource corresponding to the PRACH configuration information and the second physical resource corresponding to the supplementary resource indication information is equal to a preset time-domain offset.

19. The device as claimed in claim 16, wherein the broadcast message further comprises TRS configuration information for user equipment (UE) to perform secondary synchronization, wherein third physical resource indicated by the TRS configuration information precedes the second physical resource corresponding to the supplementary resource indication information.

20. The device as claimed in claim 16, wherein the one or more processors are further configured to:
transmit the random access preamble sequence to the base station by using the second physical resource corresponding to the supplementary resource indication information when a time interval between the physical resource occupied by the first reference SSB synchronization signal and the first physical resource is not greater than a preset threshold and no first reference SSB synchronization signal is detected on the physical resource occupied by the first reference SSB synchronization signal.

* * * * *